(12) United States Patent
Brown et al.

(10) Patent No.: US 10,093,334 B1
(45) Date of Patent: Oct. 9, 2018

(54) MOTHER/DAUGHTER INDUSTRIAL CART COUPLING ARRANGEMENT

(71) Applicants: Edmund W. Brown, Racine, WI (US); Ryan Brown, Racine, WI (US)

(72) Inventors: Edmund W. Brown, Racine, WI (US); Ryan Brown, Racine, WI (US)

( * ) Notice: Subject to any disclaimer, the term of this patent is extended or adjusted under 35 U.S.C. 154(b) by 0 days.

(21) Appl. No.: 15/657,758

(22) Filed: Jul. 24, 2017

(51) Int. Cl.
*B62B 3/18* (2006.01)

(52) U.S. Cl.
CPC ............ *B62B 3/18* (2013.01); *B62B 2207/02* (2013.01)

(58) Field of Classification Search
CPC ....... B62D 53/04–53/045; B62D 63/08; B62B 5/00; B62B 3/02
See application file for complete search history.

(56) References Cited

U.S. PATENT DOCUMENTS

| | | | | |
|---|---|---|---|---|
| 2,813,727 A * | 11/1957 | Whalen | ............. | B60D 1/00 280/408 |
| 2,903,219 A * | 9/1959 | Ingham, Jr. | ............. | B62B 3/08 220/646 |
| 3,207,253 A * | 9/1965 | Branning | ............. | B62D 53/00 180/11 |
| 4,037,678 A * | 7/1977 | Braune | ............. | B62D 53/04 180/11 |
| 4,515,518 A * | 5/1985 | Gilbert | ............. | B60P 1/6445 280/43.23 |
| 4,947,955 A * | 8/1990 | Hopely, Jr. | ............. | B62D 61/08 180/208 |
| 7,213,819 B2 * | 5/2007 | Carbonero | ......... | A63C 17/0033 280/32.6 |
| 8,302,975 B2 * | 11/2012 | Hergeth | ............. | B62B 3/04 280/47.19 |
| 8,540,255 B2 * | 9/2013 | Young | ............. | B62B 3/10 280/47.34 |
| 9,211,900 B2 * | 12/2015 | Knepp | ............. | B62B 3/08 |
| 9,227,645 B2 * | 1/2016 | Franco | ............. | B60K 7/0007 |
| 9,862,435 B2 * | 1/2018 | Scarth | ............. | B62D 53/04 |
| 2010/0066045 A1 * | 3/2010 | Presnell | ............. | B62B 1/12 280/47.18 |
| 2010/0109268 A1 * | 5/2010 | Koehler | ............. | B62B 3/008 280/33.991 |
| 2014/0008892 A1 * | 1/2014 | Holtan | ............. | B60D 1/02 280/411.1 |
| 2015/0344086 A1 * | 12/2015 | Scarth | ............. | B62D 63/08 280/411.1 |
| 2016/0101948 A1 * | 4/2016 | Berghammer | ............. | B60P 1/02 414/349 |
| 2017/0088156 A1 * | 3/2017 | Ard | ............. | B62B 5/00 |

* cited by examiner

*Primary Examiner* — Erez Gurari
(74) *Attorney, Agent, or Firm* — Boyle Fredrickson, S.C.

(57) ABSTRACT

A method and apparatus for joining at least one daughter cart to a mother cart utilize a coupling system having first and second coupling rails attached to one of the mother and daughter cart frames, and a third coupling rail attached to the other of the mother and daughter cart frames. The coupling rails all extend in a parallel manner to one another in a direction generally perpendicular to a primary transport direction and parallel the underlying surface, when engaged for conveying the daughter cart with the mother cart. The third coupling rail is retained in a channel between the first and second coupling rails, in such a manner that the daughter cart is coupled to and moves with the mother cart as the mother cart is moved in the primary transport direction while the third coupling rail is positioned in the channel between the first and second coupling rails.

47 Claims, 8 Drawing Sheets

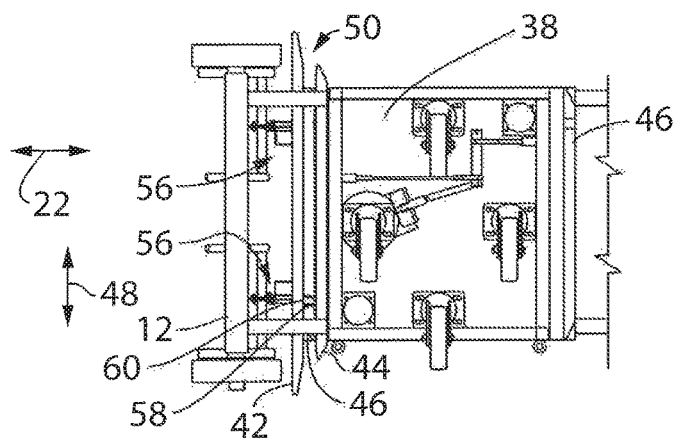
FIG. 5
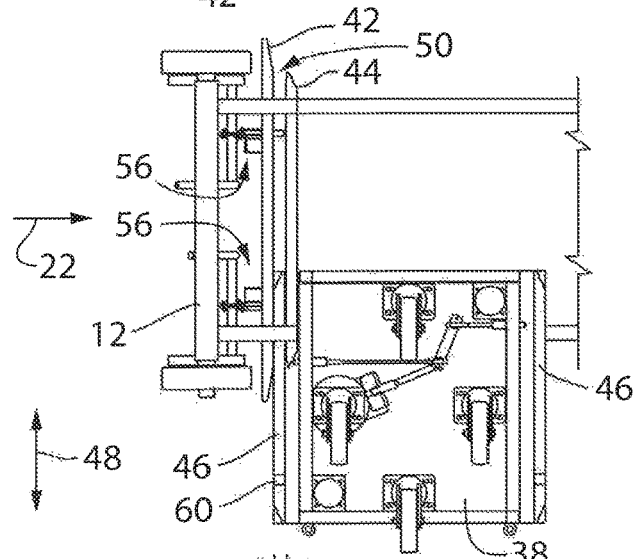
FIG. 4
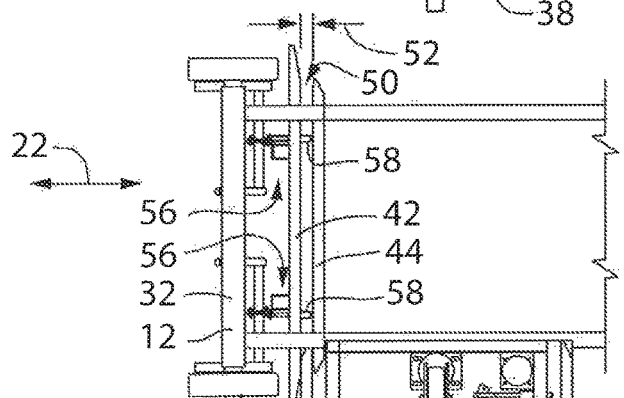
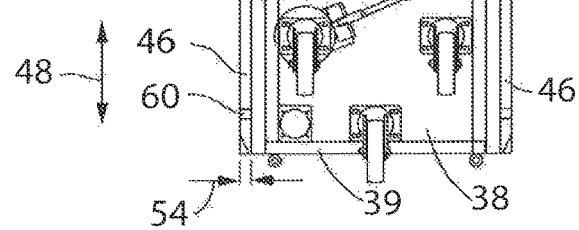
FIG. 3

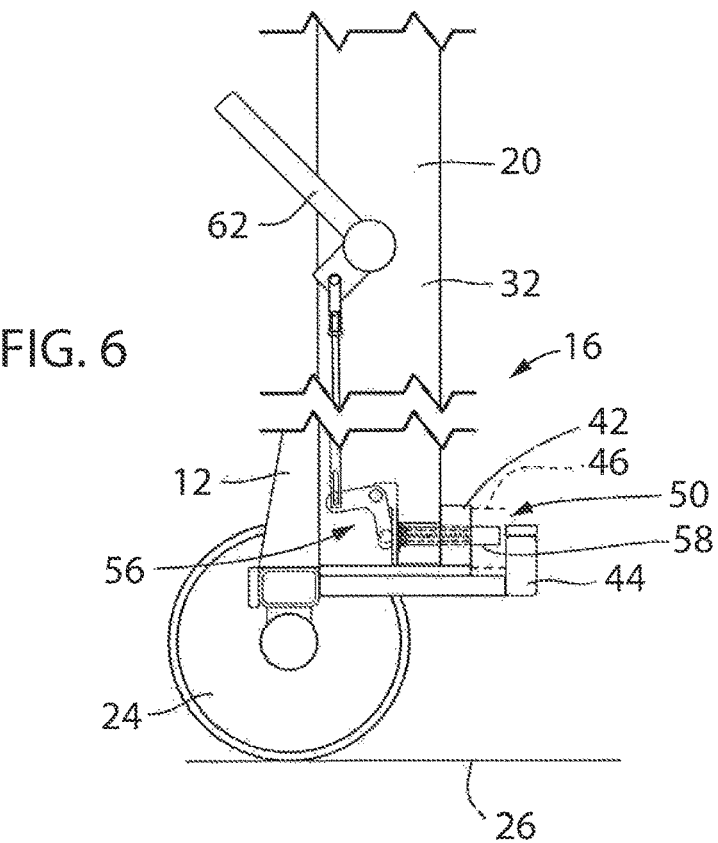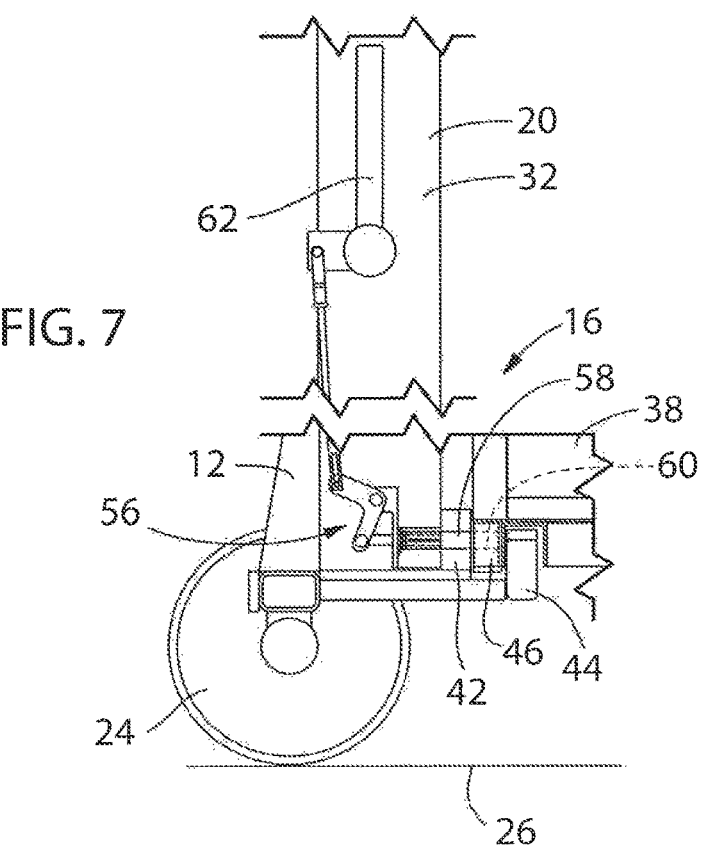

MOTHER/DAUGHTER INDUSTRIAL CART COUPLING ARRANGEMENT

FIELD OF THE INVENTION

This invention generally relates to mother/daughter cart arrangements, and more particularly to an apparatus and method for coupling one or more daughter carts to a mother cart.

BACKGROUND OF THE INVENTION

Modern manufacturing processes require that parts be delivered to work or assembly stations and stored there in a manner that facilitates operations at those stations. In the past, such deliveries of parts were often carried out by transporting parts in bins or carts, carried to the work or assembly stations by fork-lift trucks. For a variety of reasons, including improvements in efficiency and safety, manufacturing facilities are increasingly moving toward so-called "fork-free" operations, in which the delivery of parts by fork-lift trucks has largely been supplanted by mother/daughter cart arrangements pulled by manned or autonomous tugs.

A mother/daughter cart arrangement is an industrial cart system consisting of one large mother cart and one or more, smaller daughter carts. The daughter carts are designed to fit within the mother cart. Once inside, the daughter carts are locked into the mother cart. The mother cart and daughter carts are then towable together as one. Mother and daughter carts are often highly customized for optimal performance in a particular aspect of a manufacturer's operation.

The manner in which the mother and daughter carts are locked together has a major impact on the effectiveness and efficiency of the mother/daughter cart system. It is desirable that such a locking system be simple to operate, rugged in nature, and adaptable to a wide range of different types of mother and daughter carts. It is also desirable to provide an apparatus and method for coupling one or more daughter carts to a mother cart in a manner that does not require the additional complication of having to lift the daughter carts off of the underlying surface during transport. It is further desirable that the mother and daughter carts, and a system and method for coupling them to one another, allow the daughter carts to be moved into, or out of, engagement with the mother cart from either side of the mother cart.

SUMMARY OF THE INVENTION

In various forms, the invention utilizes a coupling system having first and second coupling rails attached to one of the mother and daughter cart frames, and a third coupling rail attached to the other of the mother and daughter cart frames, for joining one or more daughter carts to a mother cart. When engaged for conveying the daughter cart with the mother cart, the coupling rails all extend in a parallel manner to one another, in a direction generally perpendicular to a primary transport direction of the mother cart and parallel the underlying surface. The third coupling rail is retained in a channel between the first and second coupling rails, in such a manner that the daughter cart is coupled to and moves with the mother cart as the mother cart is moved in the primary transport direction while the third coupling rail is positioned in the channel between the first and second coupling rails.

In one form of the invention, a coupling system is provided for joining at least one daughter cart to a mother cart, where the mother cart has a mother cart frame defining a primary transport direction and supported by wheels for transport above an underlying surface, and the daughter cart has a daughter cart frame supported by casters above the underlying surface. The coupling system may include first and second coupling rails attached to one of the mother and daughter cart frames, and a third coupling rail attached to the other of the mother and daughter cart frames. The first, second and third coupling rails extend in a generally parallel manner to one another, in a direction generally perpendicular to the primary transport direction, and also generally parallel the underlying surface, when the coupling rails are operatively engaged for transporting the daughter cart with the mother cart. The first and second coupling rails may form a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails.

In some forms of the invention, the first and second coupling rails are attached to the mother cart, and the third coupling rail is attached to the daughter cart. In other forms of the invention, the first and second rails may be attached to the daughter cart and the third rail may be attached to the mother cart.

Some forms of a coupling system, according to the invention, may include a locking apparatus for locking the coupling rails against further motion with respect to one another at a desired transport position of the daughter cart with respect to the mother cart. The locking apparatus may be configured to automatically engage and lock the daughter cart to the mother cart as the daughter cart is moved in a generally perpendicular direction to the primary direction of transport with the third coupling rail slidingly disposed between the first and second coupling rails. The locking apparatus may be remotely dis-engagable, to thereby release the third rail and allow the daughter cart to be moved out of engagement from the mother cart.

In some forms of the invention, the daughter cart may include a caster locking arrangement for locking at least one caster of the daughter cart against swiveling motion, to thereby facilitate maneuvering of the daughter cart when it is not coupled to the mother cart. The coupling system may be configured such that the at least one caster wheel is automatically unlocked to allow swiveling motion of the at least one caster as the third coupling rail engages the first and second coupling rails to couple the daughter cart to the mother cart. And, the coupling system may be further configured such that the at least one caster wheel is automatically locked to preclude swiveling motion of the at least one caster as the third coupling rail disengages from the first and second coupling rails when the daughter cart is decoupled from the mother cart.

In some forms of the invention, the coupling system is configured in such a manner that the casters of the daughter cart remain in rolling supportive contact with the underlying surface when the coupling system is joining the daughter cart to the mother cart. The mother cart, daughter cart and coupling system may also be configured, in some forms of the invention, to allow the daughter cart to be coupled to the mother cart from either side of the mother cart.

One or more of the coupling system rails may be configured such that they form a common connection for coupling and conveying two or more daughter carts, using the same coupling system. In such forms of the invention, the coupling system may include a locking apparatus for each daughter cart configured for locking the coupling rails against further motion with respect to one another at a desired transport position of each of the two or more daughter carts with respect to the mother cart. The locking apparatus for each of the two or more daughter carts may be configured to individually and automatically engage and lock each of the two or more daughter carts to the mother cart as each daughter cart is moved in a generally perpendicular direction to the primary direction of transport with the third coupling rail slidingly disposed in the channel between the first and second coupling rails. The locking apparatus for each of the daughter carts may also be individually remotely dis-engagable, to thereby release the third rail and allow each of the two or more daughter carts to be moved out of engagement with the mother cart.

The invention may also alternatively take the form of a mother cart, a daughter cart, or a mother/daughter cart arrangement, where the mother cart, the daughter cart or the mother/daughter cart arrangement utilize one or more coupling systems according to the invention, for coupling one or more daughter carts to a mother cart.

In a mother cart, according to the invention, for conveying at least one daughter cart in a transport direction, where each conveyable daughter cart includes a daughter cart frame supported by casters adapted for rolling engagement with an underlying surface, the mother cart may include a mother cart frame defining a primary transport direction of the mother cart frame and supported by wheels for rolling engagement with the underlying surface, and one or more coupling rails of a coupling system having first and second coupling rails attached to one of the mother and daughter cart frames, and a third coupling rail attached to the other of the mother and daughter cart frames. The first, second and third coupling rails may extend in a generally parallel manner to one another in a direction generally perpendicular to the primary transport direction, and also generally parallel the underlying surface, when the coupling rails are operatively engaged for transporting the at least one daughter cart with the mother cart. The first and second coupling rails may form a channel between the first and second coupling rails for sliding receipt therein of the third coupling rail, in such a manner that the at least one daughter cart is coupled to and moves with the mother cart as the mother cart is moved in the primary transport direction while the third coupling rail is positioned in the channel between the first and second coupling rails.

Some forms of a mother cart, according to the invention may further include first and second coupling systems attached to the frame for selectively coupling a daughter cart to either of the first and second coupling systems. Each of the first and second coupling systems may include one or more coupling rails of a respective one of the first and second coupling systems having respective first and second coupling rails attached to one of the mother and daughter cart frames, and a respective third coupling rail attached to the other of the mother and daughter cart frames. The respective first, second and third coupling rails of the first and second coupling systems may extend in a generally parallel manner to one another in a direction generally perpendicular to the primary transport direction, and also generally parallel the underlying surface, when the coupling rails are operatively engaged for transporting the at least one daughter cart with the mother cart using the first and second coupling systems. The respective first and second coupling rails may form a respective channel between the respective first and second coupling rails for sliding receipt therein of the respective third coupling rail, in such a manner that the at least one daughter cart is coupled to and moves with the mother cart as the mother cart is moved in the primary transport direction while the respective third coupling rail is positioned in the respective channel between the respective first and second coupling rails.

In some forms of a mother cart, according to the invention, the first and second coupling rails may be attached to the mother cart, with the third coupling rail being attached to the daughter cart. In other forms of a mother cart, according to the invention, the first and second coupling rails may be attached to the daughter cart, with the third coupling rail being attached to the mother cart.

The mother cart frame may have a generally inverted U-shape, with front and rear substantially vertically extending ends joined at upper ends thereof by a substantially horizontally extending section thereof. The mother cart frame may be further configured for attachment of the at least one daughter cart to the mother cart frame using the coupling system in such a manner that the at least one daughter cart is positioned for transport beneath the horizontally extending section and between the front and rear substantially vertically extending sections of the mother cart frame. In some forms of a mother cart, according to the invention, the casters of each daughter cart may remain in rolling supportive contact with the underlying surface when the coupling system is joining the daughter cart to the mother cart. In some forms of a mother cart, according to the invention, the mother cart, daughter cart and coupling system may be configured to allow the daughter cart to be coupled to the mother cart from either side of the mother cart.

The coupling system, in some mother carts according to the invention, may further include a locking apparatus for locking the coupling rails against further motion with respect to one another at a desired transport position of the daughter cart with respect to the mother cart. The locking apparatus may be configured to automatically engage and lock the daughter cart to the mother cart as the daughter cart is moved in a generally perpendicular direction to the primary direction of transport with the third coupling rail slidingly disposed between the first and second coupling rails. The locking apparatus may also be remotely dis-engagable, to thereby release the third rail and allow the daughter cart to be moved out of engagement from the mother cart.

In a mother cart, according to the invention, one or more of the coupling system rails may be configured such that they form a common connection for coupling and conveying two or more daughter carts. The mother cart may also include a locking apparatus for each daughter cart configured for locking the coupling rails against further motion with respect to one another at a desired transport position of each of the two or more daughter carts with respect to the mother cart. The mother cart may be further configured such that the locking apparatus for each of the two or more daughter carts is configured to individually and automatically engage and lock each of the two or more daughter carts to the mother cart as each daughter cart is moved in a generally perpendicular direction to the primary direction of transport with the third coupling rail slidingly disposed in the channel between the first and second coupling rails. The locking apparatus for each of the daughter carts may also be individually remotely dis-engagable, to thereby release the third rail and allow each of the two or more daughter carts to be moved out of engagement with the mother cart.

In forms of the invention where the least one daughter cart includes a caster locking arrangement for locking at least one caster against swiveling motion, the coupling system of the mother cart may be configured such that the at least one caster wheel is automatically unlocked to allow swiveling motion of the at least one caster as the third coupling rail engages the first and second coupling rails to couple the at least one daughter cart to the mother cart. The coupling system of the mother cart may be further configured such that the at least one caster wheel is automatically locked to preclude swiveling motion of the at least one caster as the third coupling rail disengages from the first and second coupling rails when the at least one daughter cart is decoupled from the mother cart.

Some forms of a mother cart, according to the invention, may include a four-wheel steering arrangement, to improve maneuverability. Such a four-wheel steering arrangement may include a linkeage arrangement operatively connecting front and rear steerable wheels of the mother cart. Where the mother cart has an inverted U-shape with an elevated generally horizontally extending central section, the linkeage of the four-wheel steering arrangement may extend up from the front wheels, along the horizontally extending section and back down to the rear wheels.

A daughter cart, according to the invention, may be adapted for conveyance in a transport direction by a mother cart having a mother cart frame defining a primary transport direction of the mother frame and supported by wheels for rolling engagement with the underlying surface. The daughter cart may include a daughter cart frame supported by casters adapted for rolling engagement with an underlying surface, and one or more coupling rails of a coupling system having first and second coupling rails attached to one of the mother and daughter cart frames, and a third coupling rail attached to the other of the mother and daughter cart frames. The first, second and third coupling rails may extend in a generally parallel manner to one another in a direction generally perpendicular to the primary transport direction, and also generally parallel the underlying surface, when the coupling rails are operatively engaged for transporting the daughter cart with the mother cart. The first and second coupling rails may form a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails.

Some forms of a daughter cart, according to the invention, may also include first and second coupling systems attached to the frame for selectively coupling the daughter cart to a mother cart using either of the first and second coupling systems. Each of the first and second coupling systems may include one or more coupling rails of a respective one of the first and second coupling systems having respective first and second coupling rails attached to one of the mother and daughter cart frames, and a respective third coupling rail attached to the other of the mother and daughter cart frames. The respective first, second and third coupling rails of the first and second coupling systems may extend in a generally parallel manner to one another in a direction generally perpendicular to the primary transport direction, and also generally parallel the underlying surface, when the coupling rails are operatively engaged for transporting the daughter cart with the mother cart using one of the first and second coupling systems. The respective first and second coupling rails may form a respective channel between the respective first and second coupling rails for sliding receipt therein of the respective third coupling rail, in such a manner that the daughter cart is coupled to and moves with the mother cart as the mother cart is moved in the primary transport direction while the respective third coupling rail is positioned in the respective channel between the respective first and second coupling rails.

In some forms of a daughter cart, according to the invention, the first and second coupling rails are attached to the mother cart, and the third coupling rail is attached to the daughter cart. Alternatively, in other forms of a daughter cart, according to the invention, the first and second coupling rails are attached to the daughter cart, and the third coupling rail is attached to the mother cart.

Some daughter carts, according to the invention, may be configured for use with a mother cart having a mother cart frame that has a generally inverted U-shape, with front and rear substantially vertically extending ends joined at upper ends thereof by a substantially longitudinally extending section thereof, where the mother cart frame is further configured for attachment of the at least one daughter cart to the mother cart frame using the coupling system in such a manner that the at least one daughter cart is positioned for transport beneath the horizontally extending section and between the front and rear substantially vertically extending sections of the mother cart frame.

In some forms of a daughter cart, according to the invention, the casters of each daughter cart remain in rolling supportive contact with the underlying surface when the coupling system is joining the daughter cart to the mother cart. A daughter cart, mother cart and coupling system, according to the invention, may be configured to allow the daughter cart to be coupled to the mother cart from either side of the mother cart.

The coupling system, in some forms of a daughter cart, according to the invention may further include a locking apparatus for locking the coupling rails against further motion with respect to one another at a desired transport position of the daughter cart with respect to the mother cart. The locking apparatus may be configured to automatically engage and lock the daughter cart to the mother cart as the daughter cart is moved in a generally perpendicular direction to the primary direction of transport with the third coupling rail slidingly disposed between the first and second coupling rails. The locking apparatus of a daughter cart, according to the invention, may be remotely dis-engagable, to thereby release the third rail and allow the daughter cart to be moved out of engagement from the mother cart.

In some forms of a daughter cart, according to the invention, one or more of the coupling system rails may be configured such that they form a common connection for coupling and conveying two or more daughter carts to the mother cart with the coupling system. The coupling system for each daughter cart may include a locking apparatus for each daughter cart, configured for locking the coupling rails against further motion with respect to one another at a desired transport position of each of the two or more daughter carts with respect to the mother cart. The locking apparatus for each of the two or more daughter carts may be configured to individually and automatically engage and lock each of the two or more daughter carts to the mother cart as each daughter cart is moved in a generally perpendicular direction to the primary direction of transport with the third coupling rail slidingly disposed in the channel between the first and second coupling rails. The locking apparatus for each of the daughter carts may also be individually remotely dis-engagable, to thereby release the third rail and allow each of the two or more daughter carts to be moved out of engagement with the mother cart.

A daughter cart, according to the invention, may include a caster locking arrangement for locking at least one caster against swiveling motion. The coupling system may be configured such that the at least one caster wheel is automatically unlocked to allow swiveling motion of the at least one caster as the third coupling rail engages the first and second coupling rails to couple the at least one daughter cart to the mother cart. And, the coupling system may be further configured such that the at least one caster wheel is automatically locked to preclude swiveling motion of the at least one caster as the third coupling rail disengages from the first and second coupling rails when the at least one daughter cart is decoupled from the mother cart.

A daughter cart, according to the invention, may take the form of an over-cart having a frame that defines a generally inverted U-shape, with first and second substantially vertically extending side sections joined at upper ends thereof by a substantially longitudinally extending load bearing section thereof, to thereby form a space beneath over-cart frame adapted for straddling an object disposed beneath the over-cart, with the over-cart frame being further configured for attachment to a mother cart frame using a coupling system according to the invention. The longitudinally extending load bearing section of the frame may be tilted from horizontal to facilitate access to objects supported by the longitudinally extending load bearing section.

An over-cart daughter cart may be configured such that at least one additional, smaller daughter cart, having a smaller daughter cart frame supported above an underlying surface by casters may be disposed in the space beneath the over-cart. The additional, smaller daughter cart may be configured for attachment to the frame of a mother cart for conveying the at least one smaller daughter cart along a primary transport direction of the mother cart conveying the smaller daughter cart. The smaller daughter cart may be adapted for connection to the mother cart conveying the smaller daughter cart by a coupling system including first and second coupling rails attached to one of the mother and smaller daughter cart frames, and a third coupling rail attached to the other of the mother and smaller daughter cart frames. The first, second and third coupling rails may extend in a parallel manner to one another in a direction generally perpendicular to the primary transport direction and also generally parallel the underlying surface, when the coupling rails are operatively engaged for transporting the smaller daughter cart with the mother cart conveying the smaller daughter cart. The first and second coupling rails may form a channel between the first and second coupling rails for sliding receipt therein of the third coupling rail, in such a manner that the smaller daughter cart is coupled to and moves with the mother cart conveying the smaller daughter cart as the mother cart is moved in the primary transport direction while the third coupling rail is positioned in the channel between the first and second coupling rails.

The invention may be practiced with a wide variety of daughter cart types, including so-called "tilt carts" having an on-board arrangement for selectively tilting a load carrying surface of the daughter cart to facilitate operation and use of the cart.

A mother/daughter cart arrangement, according to the invention, may include a mother cart, at least one daughter cart, and a coupling system for joining the daughter cart to the mother cart. The mother cart may include a frame defining a primary transport direction and supported by wheels for transport above an underlying surface. The at least one daughter cart may have a daughter cart frame supported by casters above the underlying surface, and the coupling system may be configured for joining at the least one daughter cart to the mother cart for conveying the at least one daughter cart along the primary transport direction. The coupling system may include first and second coupling rails attached to one of the mother and daughter cart frames, and a third coupling rail attached to the other of the mother and daughter cart frames. The first, second and third coupling rails may extend in a generally parallel manner to one another in a direction generally perpendicular to the primary transport direction and also generally parallel the underlying surface, when the coupling rails are operatively engaged for transporting the daughter cart with the mother cart. The first and second coupling rails may form a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails.

In some forms of a mother/daughter cart arrangement, according to the invention, the first and second coupling rails may be attached to the mother cart, and the third coupling rail may be attached to the daughter cart. In other forms of a mother/daughter cart arrangement, according to the invention, the first and second coupling rails may be attached to the daughter cart, and the third coupling rail may be attached to the mother cart. The mother cart, daughter cart and coupling system of a mother/daughter cart arrangement according to the invention, may be configured to allow the daughter cart to be coupled to the mother cart from either side of the mother cart.

A mother/daughter cart arrangement, according to the invention, may further include a locking apparatus for locking the coupling rails against further motion with respect to one another at a desired transport position of the daughter cart with respect to the mother cart. The locking apparatus may be configured to automatically engage and lock the daughter cart to the mother cart as the daughter cart is moved in a generally perpendicular direction to the primary direction of transport with the third coupling rail slidingly disposed between the first and second coupling rails. The locking apparatus, in a mother/daughter cart arrangement, according to the invention, may be remotely dis-engagable, to thereby release the third rail and allow the daughter cart to be moved out of engagement from the mother cart.

In some forms of a mother/daughter cart arrangement, according to the invention, one or more of the coupling system rails may be configured such that they form a common rail connection for coupling and conveying two or more daughter carts with the mother cart using the common rail connection of the coupling system.

The invention may also take the form of a method for joining at least one daughter cart to a mother cart, where the mother cart has a mother cart frame defining a primary transport direction and supported by wheels for transport above an underlying surface, and the daughter cart has a daughter cart frame supported by casters above the underlying surface. The method may include joining the at least one daughter cart to the mother cart using a coupling system that includes: first and second coupling rails attached to one of the mother and daughter cart frames, and a third coupling rail attached to the other of the mother and daughter cart frames; the first, second and third coupling rails extending in a parallel manner to one another in a direction generally perpendicular to the primary transport direction and parallel the underlying surface, when the coupling rails are operatively engaged for transporting the daughter cart with the mother cart; the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails.

A method, according to the invention, may also include configuring one or more of the coupling system rails to form a common rail connection for coupling and conveying two or more daughter carts with the mother cart, and connecting at least one daughter cart to the mother cart using the common rail connection of the coupling system. Some forms of a method, according to the invention, may also include, locking the daughter cart into the coupling system. Where the daughter cart includes a lockable swiveling caster wheel that is selectively lockable to preclude swiveling motion of the caster wheel, a method, according to the invention may further include automatically unlocking the caster wheel with the coupling system as the daughter cart engages the mother cart, to thereby allow swiveling motion of the swiveling caster wheel when the daughter cart is coupled to the mother cart, and automatically locking the swiveling caster wheel against pivoting motion, with the coupling system, as the daughter cart disengages from the mother cart.

These and other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 3-5 are partial orthographic views, looking upward from an underlying surface supporting the mother and daughter cart, sequentially illustrating various aspects of the invention, as the daughter cart of FIG. 2 is coupled to the mother cart of FIG. 1, according to the invention;

FIGS. 6 and 7 are partial orthographic, enlarged views showing details of a locking apparatus for locking a daughter cart to a mother cart during transport of the daughter cart by the mother cart;

Figure 1:
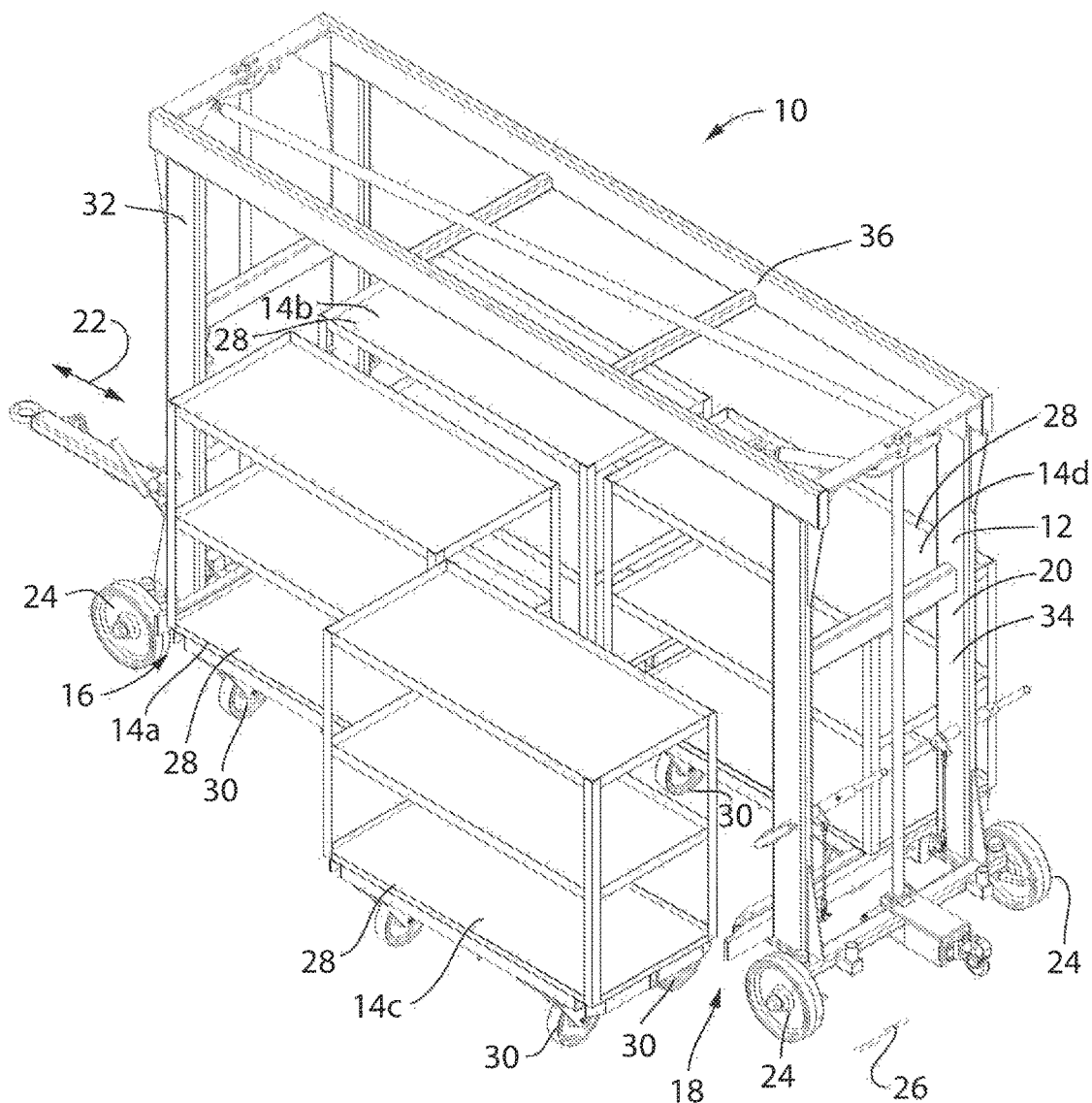
FIG. 1 is a perspective illustration of an exemplary embodiment of a mother/daughter cart arrangement, according to the invention, for transporting several multi-shelf daughter carts with a mother cart.

While the invention is described in connection with certain exemplary embodiments, there is no intent to limit the scope of the invention to those embodiments. On the contrary, the intent is to cover all alternatives, modifications and equivalents as included within the spirit and scope of the invention. To facilitate understanding of various aspects and embodiments of the invention, like features are selectively labeled with like reference numerals in some alternate embodiments of the invention.

DETAILED DESCRIPTION OF THE PREFERRED EMBODIMENTS

FIG. 1 shows an exemplary embodiment of mother/daughter cart arrangement 10, according to the invention, which includes a mother cart 12, four identical daughter carts 14a,14b,14c,14d, and front and rear coupling systems 16,18 for joining the daughter carts 14a-d to the mother cart 12. The mother cart 12 includes a mother cart frame 20 defining a primary transport direction, as indicated by double-headed arrow 22 and supported by wheels 24 for transport above an underlying surface 26. Each of the four daughter carts 14a-d includes a daughter cart frame 28 supported by casters 30 above the underlying surface 26.

As described in more detail below, in the exemplary embodiment of the mother/daughter cart arrangement 10, the front and rear coupling systems 16,18 are each configured for joining one or two of the daughter carts 14a-d to the mother cart 12 for conveying the connected daughter carts 14a-d along the primary transport direction 22. It will be understood, however, that in other embodiments of the invention, a mother cart, daughter cart, and coupling system may be configured for connecting fewer or more daughter carts to a single mother cart.

The mother cart frame 20, in the exemplary embodiment 10, has a generally inverted U-shape, with front and rear substantially vertically extending ends 32,34 joined at upper ends thereof by a substantially horizontally extending section 36 of the mother cart frame 20. By virtue of this inverted U-shape, the mother cart frame 20 is configured for attachment of the daughter carts 14a-d to the mother cart frame 20 using the front and rear coupling systems 16,18 in such a manner that the coupled daughter carts 14a-d are positioned for transport beneath the horizontally extending section 36 and between the front and rear substantially vertically extending sections 32,34 of the mother cart frame 20. As specifically illustrated in FIG. 1, the two daughter carts 14b,14d on the right side of the mother cart 12 are shown coupled to the mother cart frame 20 by the front and rear coupling systems 16,18, and the two daughter carts 14a,14c on the left side of the mother cart 12 are shown partly engaging, and disengaged from, the front and rear coupling systems 16,18, respectively. It will be understood, however, that practice of the invention is not limited to mother carts having an inverted U-shaped mother cart frame.

The exemplary embodiment of the mother cart 12 also includes a four-wheel steering arrangement, to improve maneuverability. As shown in FIG. 1, the four-wheel steering arrangement in the exemplary embodiment of the mother cart 12 includes a linkage arrangement operatively connecting front and rear steerable wheels 24 of the mother cart 12, that extends up from the front wheels 24, along the horizontally extending section 36 and back down to the rear wheels 24. It will be understood, however, that practice of the invention is not limited to mother carts having four-wheel steering.

As further illustrated in FIG. 1, in the exemplary embodiment of the invention 10 the casters 30 of each daughter cart 14a-d remain in rolling supportive contact with the underlying surface 26 when the coupling systems 16,18 are joining one or more of the daughter carts 14a-d to the mother cart 12 in a manner described in more detail below. Those having skill in the art will recognize that this provides significant advantage and simplification over prior mother/daughter cart arrangements in which the daughter carts needed to be lifted off of the underlying surface for transport by the mother cart.

It will also be appreciated, from FIG. 1 and the description below, that in the exemplary embodiment 10, according to the invention, the mother cart 12, daughter carts 14a-14d and both the front and rear coupling systems 16,18 are configured to allow the daughter carts 14a-d to be inserted into and coupled to the mother cart 12, or to be decoupled and removed, from either side of the mother cart 12. This provides significant operational advantage over prior mother/daughter cart arrangements where the daughter carts can be inserted into and removed from only one side of their mother cart.

It will be further appreciated, that the invention may be practiced with daughter carts having a wide variety of configurations matched to the function that they are to perform. The daughter carts 14a-d shown in FIG. 1 are multi-shelf carts, having three generally extending horizontal support surfaces, spaced vertically from one another, for supporting objects during transport and at a worksite.

Figure 2:
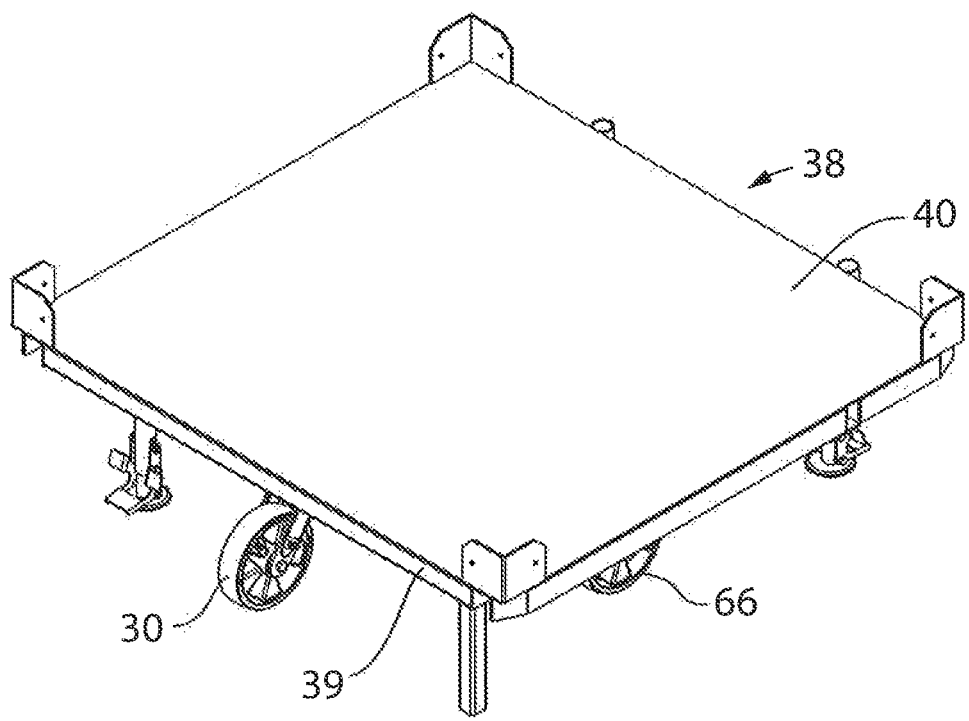
FIG. 2 is a perspective illustration of an alternate embodiment of a single-shelf daughter cart, according to the invention, for transport with the mother cart of FIG. 1.

FIG. 2 shows and alternate embodiment of a single-shelf daughter cart 38, having a single flat support surface 40, and a daughter cart frame 39 supported by three freely swiveling casters 30, and one lockable swiveling caster 66 for rolling support of objects on the support surface 40 above the underlying surface 26. The single-shelf daughter cart 38 is also configured for connection to the mother cart frame 12 using either of the front or rear coupling systems 16,18, in essentially the same manner as the multi-shelf daughter carts 14a-d. The single-shelf daughter cart 38 is approximately twice as wide as the multi-shelf daughter carts 14a-d, and designed such that it would be the only daughter cart 38 connected to the mother cart 12 by a respective one of the front or rear coupling systems 16,18, rather than having two daughter carts such as the two front carts 14a,14c coupled in a side-by-side arrangement to a common front coupling system 16. For purposes of illustration, details of the front coupling system 16, will be described with reference to FIGS. 3-5, which illustrate sequentially the manner in which the single-shelf cart 38 is coupled to the mother cart 12 using the front coupling system 16.

FIGS. 3-5 illustrate sequentially the manner in which the single-shelf cart 38 is coupled to the mother cart 12 using the front coupling system 16. Since the front and rear coupling systems 16,18 of the exemplary embodiment of the mother/daughter cart arrangement 10 are essentially mirror images of one another, those having skill in the art will readily understand that the description and illustrations relating to the front coupling system 16 would also apply to the rear coupling system 18. FIGS. 3-5 are bottom views, looking upward at the bottom of the mother cart 12 and the daughter cart 38 through the supporting surface 26.

The front and rear coupling systems 16,18 each include first and second coupling rails 42,44 attached the mother cart frame 20, and a third coupling rail 46 attached to the daughter cart frame (39 for the single-shelf mother cart 38; 28 for the multi-shelf daughter carts 14a-d). The exemplary embodiment of the daughter carts 14a-d and 38, include a third coupling rail 46 at either end, so that they can be connected in either of two directions to the mother cart 12.

The first, second and third coupling rails 42,44,46 extend in a generally parallel manner to one another in a direction, as indicated by double-headed arrow 48, that is generally perpendicular to the primary transport direction 22, and also generally parallel the underlying surface 26, when the coupling rails 42,44,46 are operatively engaged, as shown in FIG. 5 for transporting the daughter cart 38 with the mother cart 12. The first and second coupling rails 42,44 form a channel 50 between the first and second coupling rails 42,44, having a width 52 that is slightly wider than the width 54 of the third coupling rail 46, for sliding receipt in the channel 50 of the third coupling rail 46. FIGS. 3-5 sequentially illustrate the daughter cart 38 being moved from the right side of the mother cart 12, in the direction 48 substantially perpendicular to the primary transport direction 22, into a transport position of the daughter cart 38, shown in FIG. 5, where the daughter cart 38 is coupled to and moves with the mother cart 12 as the mother cart 12 is moved in the primary transport direction 22 while the third coupling rail 46 is positioned in the transport position in the channel 50 between the first and second coupling rails 42,44.

As shown in FIGS. 3-7, the front and rear coupling systems 16,18, in the exemplary embodiment of the mother/daughter cart arrangement 10, each include multiple locking apparatuses 56 for locking the coupling rails 42,44,46 against further motion with respect to one another, at a desired transport position of the daughter carts (38,14a-d) with respect to the mother cart 12. The locking apparatuses 56 each include a spring-loaded locking pin 58 mounted in the first coupling rail 42 and extending into the channel 50 between the first and second rails 42, 44, that is configured to automatically engage a slot or receptacle 60 in the third rail 46 to lock the daughter cart (38,14a-d) to the mother cart 12 as the daughter cart (38,14a-d) is moved in the direction 48, generally perpendicular to the primary direction of transport 22, with the third coupling rail 46 slidingly disposed between the first and second coupling rails 42,44.

As shown in FIGS. 3-5, the outer ends of the first, second and third coupling rails 42,44,46 of the coupling systems 16,18 in the exemplary embodiment of the mother/daughter cart arrangement 10, are beveled to facilitate guiding the third coupling rail 46 into the channel 50 between the first and second rails 42,44. As the daughter cart (38,14a-d) is moved laterally 48 into engagement with the mother cart 12, the bevel at the end of the third rail 46 engages and moves the spring-loaded locking pin 58 back into the first rail 42. When the daughter cart (38,14a-d) reaches the transport position, the slot 60 is aligned with the locking pin 58, allowing the spring to move the locking pin 58 into engagement with the slot 60 in the third rail 46, to thereby allow the coupling system 16 to lock the daughter cart (38,14a-d) in the transport position.

The locking apparatuses 56 of the exemplary embodiment 10 are remotely dis-engagable, using coupling lock release mechanisms 62 operatively connected between the locking pin 58 and the mother cart frame 20, to withdraw the locking pin 58 from the slot 60, to thereby release the third rail 46 and allow the daughter cart (38,14a-d) to be moved out of engagement with the mother cart 12. When the daughter cart (38,14a-d) is locked into position, a release handle of the locking mechanism 62 is in the position shown in FIG. 6. To unlock the daughter cart (38,14a-d) from the mother cart 12, the handle of the release mechanism 62 is moved to and held in the "unlocked" position shown in FIG. 7, to withdraw the locking pin 58 from engagement with the slot 60 in the third rail 46, and the daughter cart (38,14*a-d*) is pushed or pulled laterally out of engagement with the mother cart 12.

In the mother cart 12, of the exemplary embodiment 10, as illustrated in FIGS. 1-5, the first and second rails 42,44 of both the front and rear coupling systems 16,18 form a common connection channel 50 for coupling and conveying one single-shelf daughter cart 38, or alternatively, two of the multi-shelf daughter carts 14*a-d* side-by-side. The mother cart 12 includes separate locking apparatuses 56, with remote release mechanisms 62 for each daughter cart (38, 14*a-d*). In other embodiments of the invention, fewer or more locking arrangements may be provided, depending on how many daughter carts the mother cart is adapted to transport. For example, in an embodiment of the invention configured to transport only a single daughter cart 38 attached to one of the front or rear coupling systems 16,18, only one locking apparatus 56 may be required, perhaps with the locking pin 58 and slot 60 being repositioned to align along a common longitudinal centerline of the mother and daughter carts 12,38.

Figure 8:
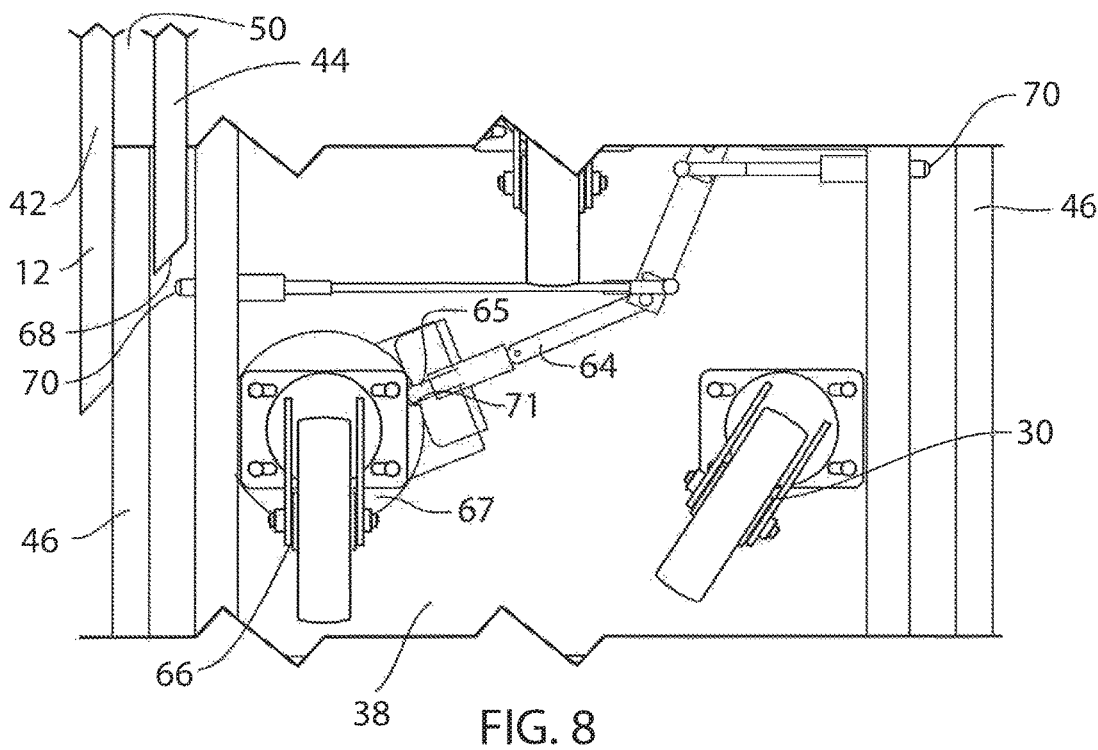
FIGS. 8 and 9 are sequential, partial orthographic bottom views of a caster locking apparatus of the daughter cart of FIG. 2, according to the invention.
Figure 9:
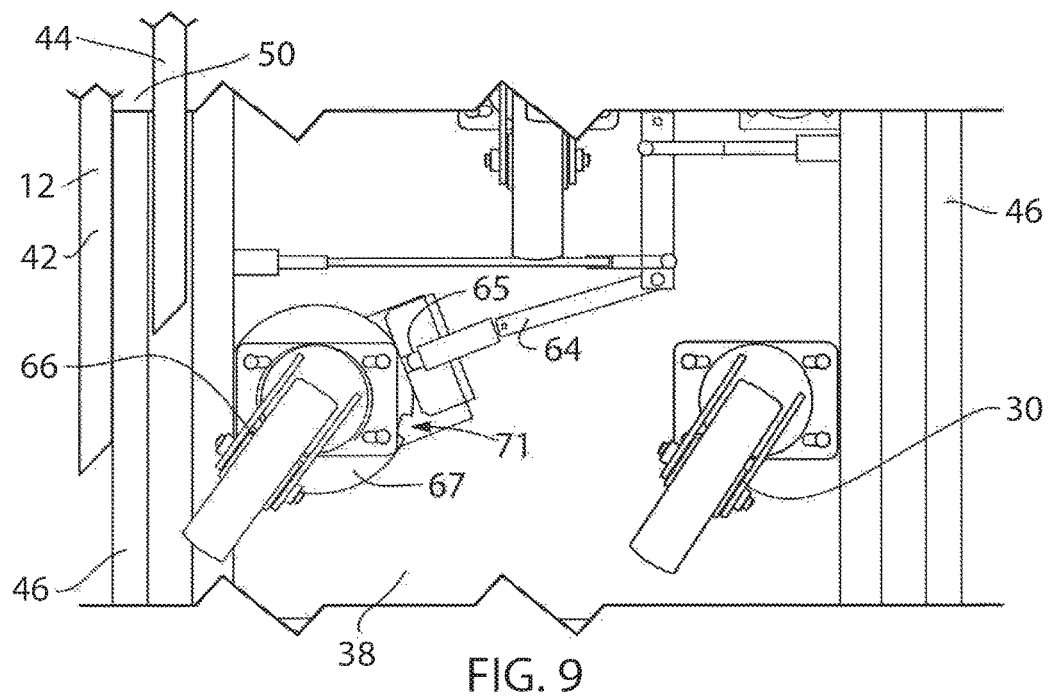

As shown in FIGS. 8 and 9, in the exemplary embodiment of the mother/daughter cart arrangement 10, the daughter cart 38 includes a spring-loaded caster locking arrangement 64, as part of the coupling systems 16,18 for locking a lockable caster 66 of the daughter cart 38 against swiveling motion, in the manner shown in FIG. 8, to thereby facilitate maneuvering of the daughter cart 38 when it is not coupled to the mother cart 12. The caster locking arrangement 64 of the coupling systems 16,18 are configured such that the lockable caster 66 is automatically unlocked as the third coupling rail 46 engages the channel 50 between first and second coupling rails 42,44 to couple the daughter cart 38 to the mother cart 12, and thereby allow the lockable caster 66 to swivel freely with the other casters 30 in the manner illustrated in FIG. 9 as the daughter cart 38 is transported by the mother cart 12, with the daughter cart casters 30,66 in rolling contact with the underlying surface 26.

As shown sequentially in FIGS. 8 and 9, as the third rail 46 of the daughter cart 38 travels along the channel 50 between the first and second coupling rails 42,44 of the mother cart 12, a beveled surface 68 at a distal end of the second coupling rail 44 engages a caster-lock actuation pin 70 of the caster-locking arrangement 64, and pushes the caster-lock actuation pin 70 inward. This inward motion of the caster-lock actuation pin 70 causes a linkage of the caster-locking arrangement 64 to retract a caster locking pin 65 from a caster locking slot 71 of a swiveling portion 67 of the lockable caster 66, to thereby allow the lockable caster 66 to swivel freely with the other casters 30. In the exemplary embodiment of the daughter cart 38, the swiveling portion 67 of the lockable caster has two caster-locking slots 71, located at 180 degrees from one another, (only one of which is shown in FIGS. 8 and 9), so that the lockable caster 66 may be locked in either of two positions with the caster 66 aligned substantially parallel to the third rail 46. Having two caster-locking slots 71 located in this manner allows the lockable caster 66 to follow the other casters 30 and align with the channel 50 between the first and second coupling rails 42,44 regardless of whether the daughter cart 38 is inserted into the mother cart 12 from the left or right sides of the mother cart 12.

With further consideration of FIGS. 8 and 9, and the description above, it will be appreciated that as the third rail 46 is moved out of the channel 50 to decouple the daughter cart 38 from the mother cart 12, the caster locking arrangement 64 automatically re-engages to lock the lockable caster 66 in an orientation substantially parallel to the third rail 46 of the daughter cart 38, and thereby preclude swiveling motion of the lockable caster as the third coupling rail 46 disengages from the first and second coupling rails 42,44 during the process of decoupling the daughter cart 38 from the mother cart 12.

Figure 10:
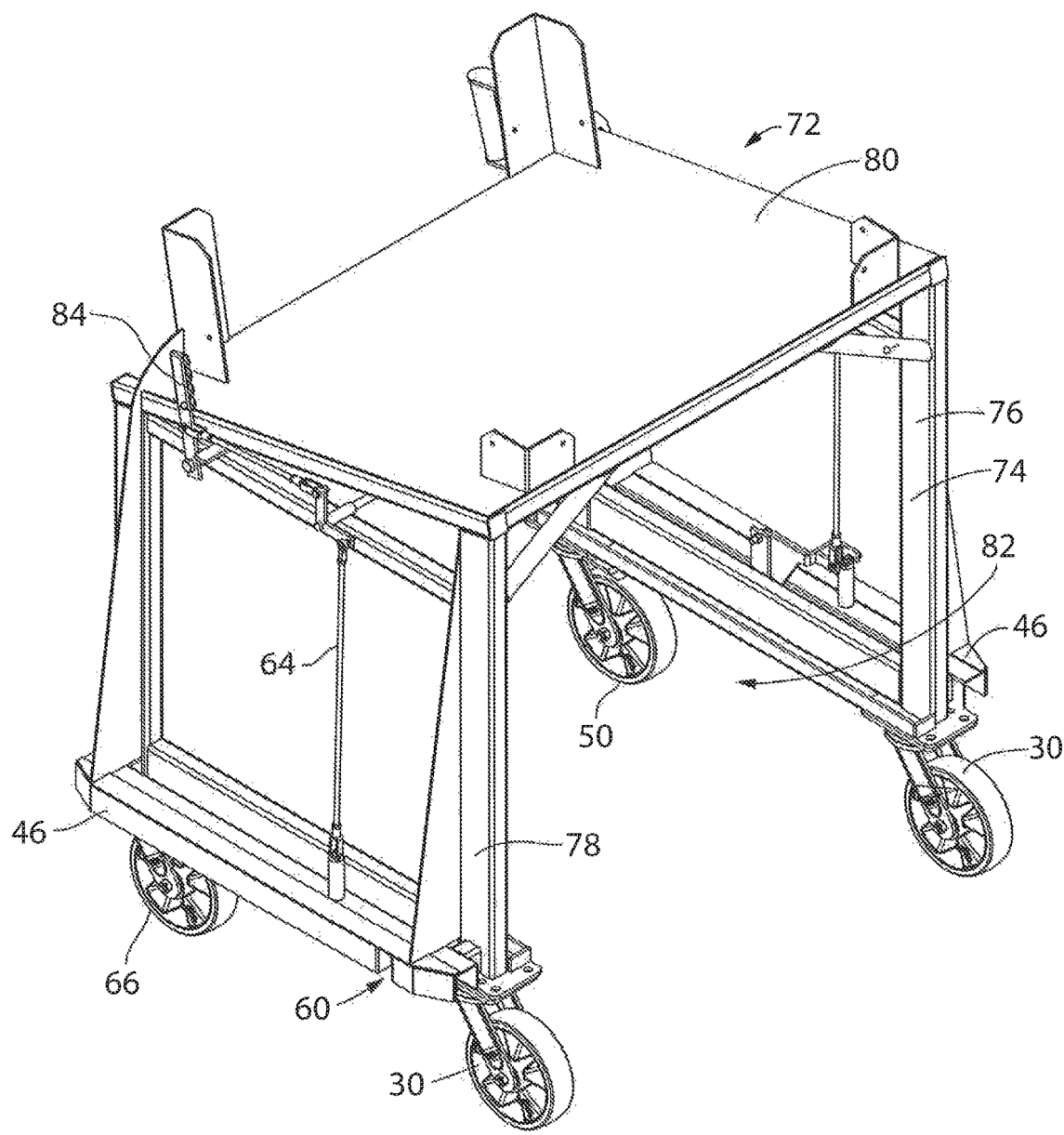
FIG. 10 is a perspective view of an alternate embodiment of a daughter cart, in the form of an "over-cart," according to the invention.
Figure 11:
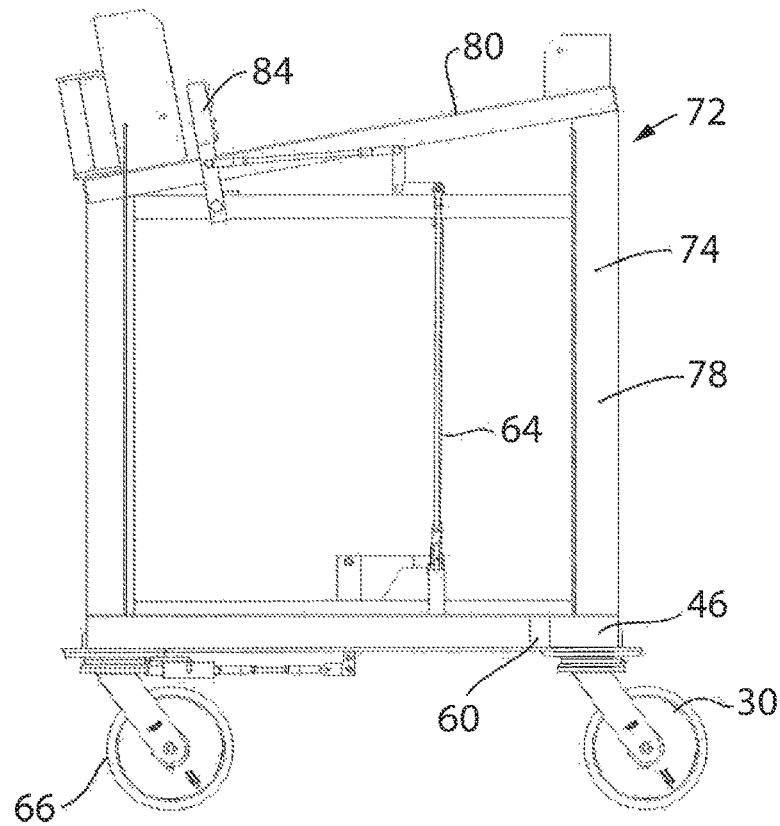
FIGS. 11 and 12 are orthographic side and front views of the over-cart of FIG. 10.
Figure 12:
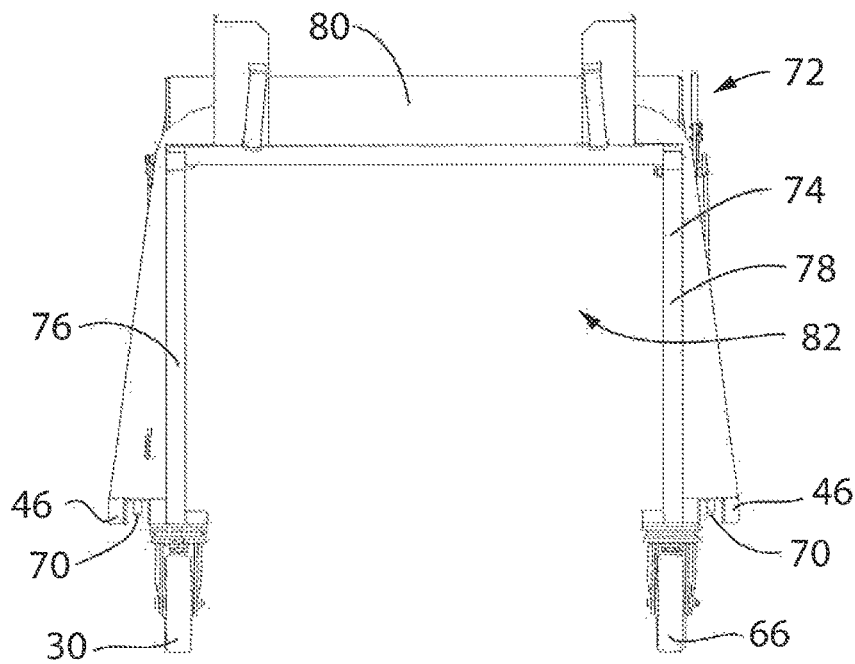

FIGS. 10-12 show another alternate embodiment of a daughter cart, according to the invention, in the form of a so-called "over-cart 72." The over-cart 72 includes a frame 74 that defines a generally inverted U-shape, with first and second substantially vertically extending side sections 76,78 joined at upper ends thereof by a substantially longitudinally extending load bearing section 80 of the frame. The U-shaped frame 74 forms a space 82 beneath over-cart frame 74 that is adapted for straddling an object disposed beneath the over-cart 72. The over-cart frame 74 is further configured for attachment to a mother cart, such as the mother cart 12, using a coupling system according to the invention of the type described above. The longitudinally extending load bearing section 80 of the frame may be tilted from horizontal, as best seen in FIG. 11, to facilitate access to objects supported by the longitudinally extending load bearing section 80.

As shown in FIGS. 10-12, the over-cart frame 74 includes a pair of third coupling rails 46, attached respectively to the first and second vertically extending sides 76,78 of the frame 74, for operative connection to the first and second coupling rails 42,44 of the mother cart 12, so that the over-cart 72 may be coupled to the mother cart 12 for transport. Each of the over cart third coupling rails includes a slot 60 for receiving a locking pin 58 of one of the locking apparatuses 56 of the mother cart 12, for locking the over-cart 72 to the mother cart 12 during transport.

The over-cart 72 also includes a lockable caster 66 and a caster locking arrangement 64 for unlocking and locking the lockable caster 66 as the over-cart 72 is coupled to, and decoupled from the mother cart 12. The caster locking arrangement 64 of the over-cart is generally similar in form and function to the caster locking arrangement 64 of the single-shelf daughter cart 38 described above, with necessary adaptation to accommodate the inverted U-shape of the over cart frame 74. For example, in the over-cart 72, the actuation pins 70 of the caster locking apparatus 64 are oriented in a generally vertical direction, best seen in FIG. 12, rather than extending generally horizontally like the actuation pins 70 in the single-shelf daughter cart 38. Also, the caster locking arrangement 64 of the over-cart 72 includes a manual caster release lever 84, that allows the lockable caster 66 of the over-cart 72 to be released, if desired, when the over-cart 72 is not coupled to the mother cart 12, to facilitate maneuvering of the over-cart 72. It will be understood that the alternate positioning of the actuation pin 70 and provision of a manual caster release lever may be incorporated into embodiments of the invention other than an over-cart.

Figure 13:
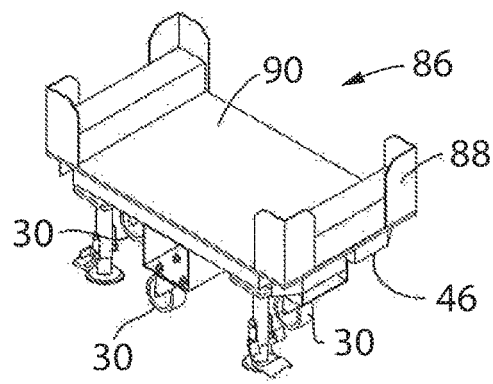
FIG. 13 is a perspective view of a smaller daughter cart, according to the invention, for use with the over-cart of FIGS. 10-12.
Figure 14:
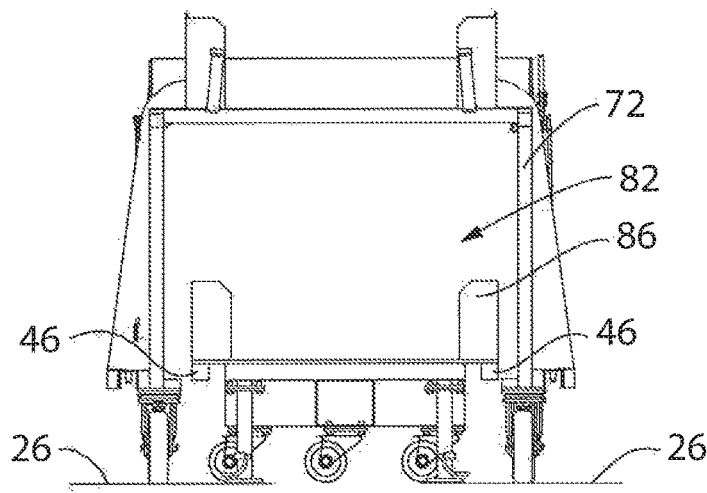
FIGS. 14 and 15 are orthographic views showing alternate arrangements for use of the exemplary embodiment of the smaller daughter cart of FIG. 13 with the exemplary embodiment of the over-cart of FIGS. 10-12.
Figure 15:
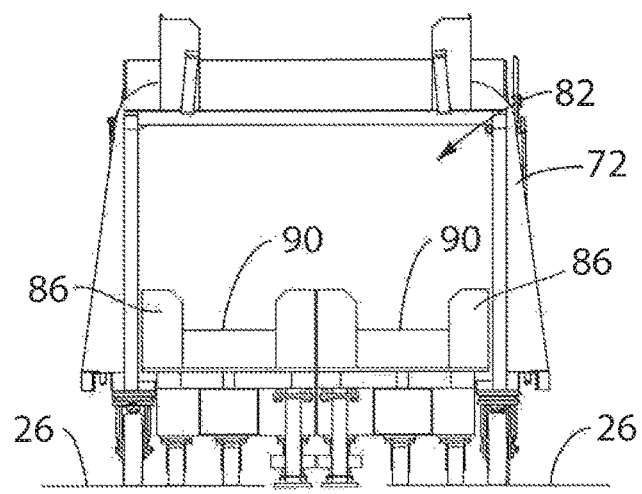

As shown in FIGS. 14-15, an over-cart daughter cart 72 may be specifically sized and configured such that at least one additional, smaller daughter cart 86, having a smaller daughter cart frame 88 supported above an underlying surface 26 by casters 30, as shown in FIG. 13, may be disposed in the space 82 beneath the over-cart 72. The additional, smaller daughter cart 86 may be configured with third rails 46 for attachment to the frame 20 of the mother cart 12 for conveying one or more of the smaller daughter cart(s) 86 along the primary transport direction 22 of the mother cart 12 conveying the smaller daughter cart(s) 86. The exemplary embodiment of the smaller daughter cart 86 is configured and adapted for connection to the mother cart 12 conveying the smaller daughter cart 86 by one of the front and rear coupling systems 16,18, in the manner described above with regard to other exemplary embodiments of daughter and carts 38,72,14a-c, described herein above.

As shown in FIGS. 13 and 15, the over-cart 72 and smaller daughter carts 86 may be configured to operate as a set of nested daughter carts, in which the space 82 under the over-cart 72 is configured to accommodate a single smaller daughter cart 86 sized to just fit in the space 82, as shown in FIG. 14, or multiple daughter carts 86 sized to fit into the space 82 in a side-by-side orientation, as shown in FIG. 15. The third coupling rails 46 of the exemplary over-cart 72 and the smaller daughter carts 86 are also similarly configured and positioned at the same height above the underlying surface 26, to allow transport of either the over-cart 72 or the smaller daughter carts 86 with the same mother cart. The smaller daughter carts 86 shown in FIGS. 13-15 are also configured to provide a raised load bearing support surface 90, to facilitate use of the smaller daughter cart 86. It will be understood, however, that a smaller daughter cart according to the invention may take any desired configuration, within the scope of the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A coupling system for joining at least one daughter cart to a mother cart, wherein the mother cart has a mother cart frame defining a primary transport direction and supported by wheels for transport above an underlying surface, and the daughter cart has a daughter cart frame supported by casters above the underlying surface, the coupling system comprising:

first and second coupling rails attached to one of the mother and daughter cart frames, and a third coupling rail attached to the other of the mother and daughter cart frames;

wherein:

the first, second and third coupling rails extending in a parallel manner to one another in a direction generally perpendicular to the primary transport direction and parallel the underlying surface, when the coupling rails are operatively engaged for transporting the daughter cart with the mother cart;

the first and second coupling rails forming a channel between the first and second coupling rails;

at least one of the mother and daughter carts frames are moveable in a direction generally perpendicular to the primary transport direction to slideably position the third coupling rail in the channel without either the wheels of the mother cart or the casters of the daughter cart passing through the channel; and the daughter cart being coupled to and moving with the mother cart as the mother cart is moved in the primary transport direction while the third coupling rail is positioned in the channel between the first and second coupling rails.

2. The coupling system of claim 1, wherein the first and second coupling rails are attached to the mother cart, and the third coupling rail is attached to the daughter cart.

3. The coupling system of claim 1, further including a locking apparatus for locking the coupling rails against further motion with respect to one another at a desired transport position of the daughter cart with respect to the mother cart.

4. A coupling system for joining at least one daughter cart to a mother cart, wherein the mother cart has a mother cart frame defining a primary transport direction and supported by wheels for transport above an underlying surface, and the daughter cart has a daughter cart frame supported by casters above the underlying surface, the coupling system comprising:

first and second coupling rails attached to one of the mother and daughter cart frames, and a third coupling rail attached to the other of the mother and daughter cart frames; and a locking apparatus for locking the coupling rails against further motion with respect to one another at a desired transport position of the daughter cart with respect to the mother cart;

the first, second and third coupling rails extending in a parallel manner to one another in a direction generally perpendicular to the primary transport direction and parallel the underlying surface, when the coupling rails are operatively engaged for transporting the daughter cart with the mother cart;

the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails;

wherein the locking apparatus is configured to automatically engage and lock the daughter cart to the mother cart as the daughter cart is moved in a generally perpendicular direction to the primary direction of transport with the third coupling rail slidingly disposed between the first and second coupling rails.

5. A coupling system for joining at least one daughter cart to a mother cart, wherein the mother cart has a mother cart frame defining a primary transport direction and supported by wheels for transport above an underlying surface, and the daughter cart has a daughter cart frame supported by casters above the underlying surface, the coupling system comprising:
   first and second coupling rails attached to one of the mother and daughter cart frames, and a third coupling rail attached to the other of the mother and daughter cart frames; and
   a locking apparatus for locking the coupling rails against further motion with respect to one another at a desired transport position of the daughter cart with respect to the mother cart;
   the first, second and third coupling rails extending in a parallel manner to one another in a direction generally perpendicular to the primary transport direction and parallel the underlying surface, when the coupling rails are operatively engaged for transporting the daughter cart with the mother cart;
   the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails;
wherein the locking apparatus is remotely dis-engagable, to thereby release the third rail and allow the daughter cart to be moved out of engagement from the mother cart.

6. A coupling system for joining at least one daughter cart to a mother cart, wherein the mother cart has a mother cart frame defining a primary transport direction and supported by wheels for transport above an underlying surface, and the daughter cart has a daughter cart frame supported by casters above the underlying surface, the coupling system comprising:
   first and second coupling rails attached to one of the mother and daughter cart frames, and a third coupling rail attached to the other of the mother and daughter cart frames;
wherein:
   the first, second and third coupling rails extending in a parallel manner to one another in a direction generally perpendicular to the primary transport direction and parallel the underlying surface, when the coupling rails are operatively engaged for transporting the daughter cart with the mother cart;
   the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails; and
   the daughter cart includes a caster locking arrangement for locking at least one caster against swiveling motion;
   the coupling system is configured such that the at least one caster wheel is automatically unlocked to allow swiveling motion of the at least one caster as the third coupling rail engages the first and second coupling rails to couple the daughter cart to the mother cart; and
   the coupling system is further configured such that the at least one caster wheel is automatically locked to preclude swiveling motion of the at least one caster as the third coupling rail disengages from the first and second coupling rails when the daughter cart is decoupled from the mother cart.

7. The coupling system of claim 1, wherein the casters of the daughter cart remain in rolling supportive contact with the underlying surface with the coupling system joining the daughter cart to the mother cart.

8. The coupling system of claim 1, wherein the mother cart, daughter cart and coupling system are configured to allow the daughter cart to be coupled to the mother cart from either side of the mother cart.

9. A coupling system for joining at least one daughter cart to a mother cart, wherein the mother cart has a mother cart frame defining a primary transport direction and supported by wheels for transport above an underlying surface, and the daughter cart has a daughter cart frame supported by casters above the underlying surface, the coupling system comprising:
   first and second coupling rails attached to one of the mother and daughter cart frames, and a third coupling rail attached to the other of the mother and daughter cart frames;
wherein:
   the first, second and third coupling rails extending in a parallel manner to one another in a direction generally perpendicular to the primary transport direction and parallel the underlying surface, when the coupling rails are operatively engaged for transporting the daughter cart with the mother cart;
   the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails;
   the mother cart, daughter cart and coupling system are configured to allow the daughter cart to be coupled to the mother cart from either side of the mother cart; and
   one or more of the coupling system rails are configured such that they form a common connection for coupling and conveying two or more daughter carts.

10. The coupling system of claim 9, further including:
   a locking apparatus for each daughter cart configured for locking the coupling rails against further motion with respect to one another at a desired transport position of each of the two or more daughter carts with respect to the mother cart;
   the locking apparatus for each of the two or more daughter carts being configured to individually and automatically engage and lock each of the two or more daughter carts to the mother cart as each daughter cart is moved in a generally perpendicular direction to the primary direction of transport with the third coupling rail slidingly disposed in the channel between the first and second coupling rails;
   the locking apparatus for each of the daughter carts also being individually remotely dis-engagable, to thereby release the third rail and allow each of the two or more daughter carts to be moved out of engagement with the mother cart.

11. A mother cart for conveying at least one daughter cart in a transport direction, wherein each conveyable daughter cart includes a daughter cart frame supported by casters adapted for rolling engagement with an underlying surface, and the mother cart comprises:
- a mother cart frame defining a primary transport direction of the mother cart frame and supported by wheels for rolling engagement with the underlying surface; and
- one or more coupling rails of a coupling system having first and second coupling rails attached to one of the mother and daughter cart frames, and a third coupling rail attached to the other of the mother and daughter cart frames;
- the first, second and third coupling rails extending in a parallel manner to one another in a direction generally perpendicular to the primary transport direction and parallel the underlying surface, when the coupling rails are operatively engaged for transporting the at least one daughter cart with the mother cart;
- the first and second coupling rails forming a channel between the first and second coupling rails;
- at least one of the mother and daughter carts frames are moveable in a direction generally perpendicular to the primary transport direction to slideably position the third coupling rail in the channel without either the wheels of the mother cart or the casters of the daughter cart passing through the channel; and
- the at least one daughter cart being coupled to and moving with the mother cart as the mother cart is moved in the primary transport direction while the third coupling rail is positioned in the channel between the first and second coupling rails.

12. The mother cart of claim 11, further including first and second coupling systems attached to the frame for selectively coupling a daughter cart to either of the first and second coupling systems, Wherein each of the first and second coupling systems includes:
- one or more coupling rails of a respective one of the first and second coupling systems having respective first and second coupling rails attached to one of the mother and daughter cart frames, and a respective third coupling rail attached to the other of the mother and daughter cart frames;
- the respective first, second and third coupling rails of the first and second coupling systems extending in a parallel manner to one another in a direction generally perpendicular to the primary transport direction and parallel the underlying surface, when the coupling rails are operatively engaged for transporting the at least one daughter cart with the mother cart using the first and second coupling systems;
- the respective first and second coupling rails forming a respective channel between the respective first and second coupling rails for sliding receipt therein of the respective third coupling rail, in such a manner that the at least one daughter cart is coupled to and moves with the mother cart as the mother cart is moved in the primary transport direction while the respective third coupling rail is positioned in the respective channel between the respective first and second coupling rails.

13. The mother cart of claim 11, wherein the first and second coupling rails are attached to the mother cart, and the third coupling rail is attached to the daughter cart.

14. The mother cart of claim 11, wherein the mother cart frame has a generally inverted U-shape, with front and rear substantially vertically extending ends joined at upper ends thereof by a substantially horizontally extending section thereof, with the mother cart frame being further configured for attachment of the at least one daughter cart to the mother cart frame using the coupling system in such a manner that the at least one daughter cart is positioned for transport beneath the horizontally extending section and between the front and rear substantially vertically extending sections of the mother cart frame.

15. The mother cart of claim 11, wherein the casters of each daughter cart remain in rolling supportive contact with the underlying surface with the coupling system joining the daughter cart to the mother cart.

16. The mother cart of claim 11, wherein the mother cart, daughter cart and coupling system are configured to allow the daughter cart to be coupled to the mother cart from either side of the mother cart.

17. A mother cart for conveying at least one daughter cart in a transport direction, wherein each conveyable daughter cart includes a daughter cart frame supported by casters adapted for rolling engagement with an underlying surface, and the mother cart comprises:
- a mother cart frame defining a primary transport direction of the mother cart frame and supported by wheels for rolling engagement with the underlying surface; and
- one or more coupling rails of a coupling system having first and second coupling rails attached to one of the mother and daughter cart frames, and a third coupling rail attached to the other of the mother and daughter cart frames;

wherein:
- the first, second and third coupling rails extending in a parallel manner to one another in a direction generally perpendicular to the primary transport direction and parallel the underlying surface, when the coupling rails are operatively engaged for transporting the at least one daughter cart with the mother cart;
- the first and second coupling rails forming a channel between the first and second coupling rails for sliding receipt therein of the third coupling rail, in such a manner that the at least one daughter cart is coupled to and moves with the mother cart as the mother cart is moved in the primary transport direction while the third coupling rail is positioned in the channel between the first and second coupling rails; and
- the coupling system further includes a locking apparatus for locking the coupling rails against further motion with respect to one another at a desired transport position of the daughter cart with respect to the mother cart.

18. The mother cart of claim 17, wherein the locking apparatus is configured to automatically engage and lock the daughter cart to the mother cart as the daughter cart is moved in a generally perpendicular direction to the primary direction of transport with the third coupling rail slidingly disposed between the first and second coupling rails.

19. The mother cart of claim 17, wherein the locking apparatus is remotely dis-engagable, to thereby release the third rail and allow the daughter cart to be moved out of engagement from the mother cart.

20. A mother cart for conveying at least one daughter cart in a transport direction, wherein each conveyable daughter cart includes a daughter cart frame supported by casters adapted for rolling engagement with an underlying surface, and the mother cart comprises:
- a mother cart frame defining a primary transport direction of the mother cart frame and supported by wheels for rolling engagement with the underlying surface; and one or more coupling rails of a coupling system having first and second coupling rails attached to one of the mother and daughter cart frames, and a third coupling rail attached to the other of the mother and daughter cart frames;

wherein:
the first, second and third coupling rails extending in a parallel manner to one another in a direction generally perpendicular to the primary transport direction and parallel the underlying surface, when the coupling rails are operatively engaged for transporting the at least one daughter cart with the mother cart;
the first and second coupling rails forming a channel between the first and second coupling rails for sliding receipt therein of the third coupling rail, in such a manner that the at least one daughter cart is coupled to and moves with the mother cart as the mother cart is moved in the primary transport direction while the third coupling rail is positioned in the channel between the first and second coupling rails; and
one or more of the coupling system rails are configured such that they form a common connection for coupling and conveying two or more daughter carts.

21. The mother cart of claim 20, further including:
a locking apparatus for each daughter cart configured for locking the coupling rails against further motion with respect to one another at a desired transport position of each of the two or more daughter carts with respect to the mother cart;
the locking apparatus for each of the two or more daughter carts being configured to individually and automatically engage and lock each of the two or more daughter carts to the mother cart as each daughter cart is moved in a generally perpendicular direction to the primary direction of transport with the third coupling rail slidingly disposed in the channel between the first and second coupling rails;
the locking apparatus for each of the daughter carts also being individually remotely dis-engagable, to thereby release the third rail and allow each of the two or more daughter carts to be moved out of engagement with the mother cart.

22. A mother cart for conveying at least one daughter cart in a transport direction, wherein each conveyable daughter cart includes a daughter cart frame supported by casters adapted for rolling engagement with an underlying surface, and the mother cart comprises:
a mother cart frame defining a primary transport direction of the mother cart frame and supported by wheels for rolling engagement with the underlying surface; and
one or more coupling rails of a coupling system having first and second coupling rails attached to one of the mother and daughter cart frames, and a third coupling rail attached to the other of the mother and daughter cart frames;

wherein:
the first, second and third coupling rails extending in a parallel manner to one another in a direction generally perpendicular to the primary transport direction and parallel the underlying surface, when the coupling rails are operatively engaged for transporting the at least one daughter cart with the mother cart;
the first and second coupling rails forming a channel between the first and second coupling rails for sliding receipt therein of the third coupling rail, in such a manner that the at least one daughter cart is coupled to and moves with the mother cart as the mother cart is moved in the primary transport direction while the third coupling rail is positioned in the channel between the first and second coupling rails;
the at least one daughter cart includes a caster locking arrangement for locking at least one caster against swiveling motion;
the coupling system is configured such that the at least one caster wheel is automatically unlocked to allow swiveling motion of the at least one caster as the third coupling rail engages the first and second coupling rails to couple the at least one daughter cart to the mother cart; and
the coupling system is further configured such that the at least one caster wheel is automatically locked to preclude swiveling motion of the at least one caster as the third coupling rail disengages from the first and second coupling rails when the at least one daughter cart is decoupled from the mother cart.

23. A daughter cart adapted to be conveyable in a transport direction by a mother cart having a mother cart frame defining a primary transport direction of the mother frame and supported by wheels for rolling engagement with the underlying surface, wherein the daughter cart includes:
a daughter cart frame supported by casters adapted for rolling engagement with an underlying surface; and
one or more coupling rails of a coupling system having first and second coupling rails attached to one of the mother and daughter cart frames, and a third coupling rail attached to the other of the mother and daughter cart frames;

wherein
the first, second and third coupling rails extending in a parallel manner to one another in a direction generally perpendicular to the primary transport direction and parallel the underlying surface, when the coupling rails are operatively engaged for transporting the daughter cart with the mother cart;
the first and second coupling rails forming a channel between the first and second coupling rails;
at least one of the mother and daughter carts frames are moveable in a direction generally perpendicular to the primary transport direction to slideably position the third coupling rail in the channel without either the wheels of the mother cart or the casters of the daughter cart passing through the channel; and
the daughter cart being coupled to and moving moves with the mother cart as the mother cart is moved in the primary transport direction while the third coupling rail is positioned in the channel between the first and second coupling rails.

24. The daughter cart of claim 23, further including first and second coupling systems attached to the frame for selectively coupling the daughter cart to a mother cart using either of the first and second coupling systems, wherein each of the first and second coupling systems includes:
one or more coupling rails of a respective one of the first and second coupling systems having respective first and second coupling rails attached to one of the mother and daughter cart frames, and a respective third coupling rail attached to the other of the mother and daughter cart frames;
the respective first, second and third coupling rails of the first and second coupling systems extending in a parallel manner to one another in a direction generally perpendicular to the primary transport direction and parallel the underlying surface, when the coupling rails are operatively engaged for transporting the daughter cart with the mother cart using one of the first and second coupling systems;

the respective first and second coupling rails forming a respective channel between the respective first and second coupling rails for sliding receipt therein of the respective third coupling rail, in such a manner that the daughter cart is coupled to and moves with the mother cart as the mother cart is moved in the primary transport direction while the respective third coupling rail is positioned in the respective channel between the respective first and second coupling rails.

25. The daughter cart of claim 23, wherein the first and second coupling rails are attached to the mother cart, and the third coupling rail is attached to the daughter cart.

26. The daughter cart of claim 23, wherein the mother cart frame has a generally inverted U-shape, with front and rear substantially vertically extending ends joined at upper ends thereof by a substantially longitudinally extending section thereof, with the mother cart frame being further configured for attachment of the at least one daughter cart to the mother cart frame using the coupling system in such a manner that the at least one daughter cart is positioned for transport beneath the horizontally extending section and between the front and rear substantially vertically extending sections of the mother cart frame.

27. The daughter cart of claim 23, wherein the casters of each daughter cart remain in rolling supportive contact with the underlying surface with the coupling system joining the daughter cart to the mother cart.

28. The daughter cart of claim 23, wherein the mother cart, daughter cart and coupling system are configured to allow the daughter cart to be coupled to the mother cart from either side of the mother cart.

29. The daughter cart of claim 23, wherein the coupling system further includes a locking apparatus for locking the coupling rails against further motion with respect to one another at a desired transport position of the daughter cart with respect to the mother cart.

30. A daughter cart adapted to be conveyable in a transport direction by a mother cart having a mother cart frame defining a primary transport direction of the mother frame and supported by wheels for rolling engagement with the underlying surface, wherein the daughter cart includes:

a daughter cart frame supported by casters adapted for rolling engagement with an underlying surface; and one or more coupling rails of a coupling system having first and second coupling rails attached to one of the mother and daughter cart frames, and a third coupling rail attached to the other of the mother and daughter cart frames;

wherein:

the first, second and third coupling rails extending in a parallel manner to one another in a direction generally perpendicular to the primary transport direction and parallel the underlying surface, when the coupling rails are operatively engaged for transporting the daughter cart with the mother cart;

the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails;

the coupling system further includes a locking apparatus for locking the coupling rails against further motion with respect to one another at a desired transport position of the daughter cart with respect to the mother cart; and the locking apparatus is configured to automatically engage and lock the daughter cart to the mother cart as the daughter cart is moved in a generally perpendicular direction to the primary direction of transport with the third coupling rail slidingly disposed between the first and second coupling rails.

31. A daughter cart adapted to be conveyable in a transport direction by a mother cart having a mother cart frame defining a primary transport direction of the mother frame and supported by wheels for rolling engagement with the underlying surface, wherein the daughter cart includes:

a daughter cart frame supported by casters adapted for rolling engagement with an underlying surface; and one or more coupling rails of a coupling system having first and second coupling rails attached to one of the mother and daughter cart frames, and a third coupling rail attached to the other of the mother and daughter cart frames;

wherein:

the first, second and third coupling rails extending in a parallel manner to one another in a direction generally perpendicular to the primary transport direction and parallel the underlying surface, when the coupling rails are operatively engaged for transporting the daughter with the mother cart;

the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails;

the coupling system further includes a locking apparatus for locking the coupling rails against further motion with respect to one another at a desired transport position of the daughter cart with respect to the mother cart; and the locking apparatus is remotely dis-engagable, to thereby release the third rail and allow the daughter cart to be moved out of engagement from the mother cart.

32. A daughter cart adapted to be conveyable in a transport direction by a mother cart having a mother cart frame defining a primary transport direction of the mother frame and supported by wheels for rolling engagement with the underlying surface, wherein the daughter cart includes:

a daughter cart frame supported by casters adapted for rolling engagement with an underlying surface; and one or more coupling rails of a coupling system having first and second coupling rails attached to one of the mother and daughter cart frames, and a third coupling rail attached to the other of the mother and daughter cart frames;

wherein:

the first, second and third coupling rails extending in a parallel manner to one another in a direction generally perpendicular to the primary transport direction and parallel the underlying surface, when the coupling rails are operatively engaged for transporting the daughter cart with the mother cart;

the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails; and one or more of the coupling system rails are configured such that they form a common connection for coupling and conveying two or more daughter carts to the mother cart with the coupling system.

33. The daughter cart of claim 32, wherein the coupling system for each daughter cart further includes:

a locking apparatus for each daughter cart configured for locking the coupling rails against further motion with respect to one another at a desired transport position of each of the two or more daughter carts with respect to the mother cart;

the locking apparatus for each of the two or more daughter carts being configured to individually and automatically engage and lock each of the two or more daughter carts to the mother cart as each daughter cart is moved in a generally perpendicular direction to the primary direction of transport with the third coupling rail slidingly disposed in the channel between the first and second coupling rails;

the locking apparatus for each of the daughter carts also being individually remotely dis-engagable, to thereby release the third rail and allow each of the two or more daughter carts to be moved out of engagement with the mother cart.

34. A daughter cart adapted to be conveyable in a transport direction by a mother cart having a mother cart frame defining a primary transport direction of the mother frame and supported by wheels for rolling engagement with the underlying surface, wherein the daughter cart includes:

a daughter cart frame supported by casters adapted for rolling engagement with an underlying surface; and one or more coupling rails of a coupling system having first and second coupling rails attached to one of the mother and daughter cart frames, and a third coupling rail attached to the other of the mother and daughter cart frames;

wherein:

the first, second and third coupling rails extending in a parallel manner to one another in a direction generally perpendicular to the primary transport direction and parallel the underlying surface, when the coupling rails are operatively engaged for transporting the daughter cart with the mother cart;

the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails;

the at least one daughter cart includes a caster locking arrangement for locking at least one caster against swiveling motion; and the coupling system is configured such that the at least one caster wheel is automatically unlocked to allow swiveling motion of the at least one caster as the third coupling rail engages the first and second coupling rails to couple the at least one daughter cart to the mother cart; and the coupling system is further configured such that the at least one caster wheel is automatically locked to preclude swiveling motion of the at least one caster as the third coupling rail disengages from the first and second coupling rails when the at least one daughter cart is decoupled from the mother cart.

35. A daughter cart adapted to be conveyable in a transport direction by a mother cart having a mother cart frame defining a primary transport direction of the mother frame and supported by wheels for rolling engagement with the underlying surface, wherein the daughter cart includes:

a daughter cart frame supported by casters adapted for rolling engagement with an underlying surface; and one or more coupling rails of a coupling system having first and second coupling rails attached to one of the mother and daughter cart frames, and a third coupling rail attached to the other of the mother and daughter cart frames;

wherein:

the first, second and third coupling rails extending in a parallel manner to one another in a direction generally perpendicular to the primary transport direction and parallel the underlying surface, when the coupling rails are operatively engaged for transporting the daughter cart with the mother cart;

the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails; and the daughter cart is an over-cart having a frame that defines a generally inverted U-shape, with first and second substantially vertically extending side sections joined at upper ends thereof by a substantially longitudinally extending load bearing section thereof, to thereby form a space beneath over-cart frame adapted for straddling an object disposed beneath the over-cart, with the over-cart frame being further configured for attachment to the mother cart frame using the coupling system.

36. The daughter cart of claim 35, wherein:

the over-cart is configured such that at least one additional smaller daughter cart having a smaller daughter cart frame supported above an underlying surface by casters may be disposed in the space beneath the over-cart;

the additional smaller daughter cart being configured for attachment to the frame of a mother cart for conveying the at least one daughter cart along a primary transport direction of the mother cart conveying the smaller daughter cart;

the smaller daughter cart being adapted for connection to the mother cart conveying the smaller daughter cart by a coupling system including first and second coupling rails attached to one of the mother and smaller daughter cart frames, and a third coupling rail attached to the other of the mother and smaller daughter cart frames;

the first, second and third coupling rails extending in a parallel manner to one another in a direction generally perpendicular to the primary transport direction and parallel the underlying surface, when the coupling rails are operatively engaged for transporting the smaller daughter cart with the mother cart conveying the smaller daughter cart;

the first and second coupling rails forming a channel between the first and second coupling rails for sliding receipt therein of the third coupling rail, in such a manner that the smaller daughter cart is coupled to and moves with the mother cart conveying the smaller daughter cart as the mother cart is moved in the primary transport direction while the third coupling rail is positioned in the channel between the first and second coupling rails.

37. A mother/daughter cart arrangement, comprising:
a mother cart having a mother cart frame defining a primary transport direction and supported by wheels for transport above an underlying surface;
at least one daughter cart having a daughter cart frame supported by casters above the underlying surface; and
a coupling system for joining at the least one daughter cart to the mother cart for conveying the at least one daughter cart along the primary transport direction;
wherein:
the coupling system including first and second coupling rails attached to one of the mother and daughter cart frames, and a third coupling rail attached to the other of the mother and daughter cart frames;
the first, second and third coupling rails extending in a parallel manner to one another in a direction generally perpendicular to the primary transport direction and parallel the underlying surface, when the coupling rails are operatively engaged for transporting the daughter cart with the mother cart;
the first and second coupling rails forming a channel between the first and second coupling rails;
at least one of the mother and daughter carts frames are moveable in a direction generally perpendicular to the primary transport direction to slideably position the third coupling rail in the channel without either the wheels of the mother cart or the casters of the daughter cart passing through the channel; and
the daughter cart is coupled to and moves with the mother cart as the mother cart is moved in the primary transport direction while the third coupling rail is positioned in the channel between the first and second coupling rails.

38. The mother/daughter cart arrangement of claim 37, wherein the first and second coupling rails are attached to the mother cart, and the third coupling rail is attached to the daughter cart.

39. The mother daughter cart arrangement of claim 37, wherein the mother cart, daughter cart and coupling system are configured to allow the daughter cart to be coupled to the mother cart from either side of the mother cart.

40. The mother/daughter cart arrangement of claim 37, further including a locking apparatus for locking the coupling rails against further motion with respect to one another at a desired transport position of the daughter cart with respect to the mother cart.

41. A mother/daughter cart arrangement, comprising:
a mother cart having a mother cart frame defining a primary transport direction and supported by wheels for transport above an underlying surface;
at least one daughter cart having a daughter cart frame supported by casters above the underlying surface;
a coupling system for joining at the least one daughter cart to the mother cart for conveying the at least one daughter cart along the primary transport direction; and
a locking apparatus for locking the coupling rails against further motion with respect to one another at a desired transport position of the daughter cart with respect to the mother cart;
wherein:
the coupling system including first and second coupling rails attached to one of the mother and daughter cart frames, and a third coupling rail attached to the other of the mother and daughter cart frames;
the first, second and third coupling rails extending in a parallel manner to one another in a direction generally perpendicular to the primary transport direction and parallel the underlying surface, when the coupling rails are operatively engaged for transporting the daughter cart with the mother cart;
the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails; and
the locking apparatus is configured to automatically engage and lock the daughter cart to the mother cart as the daughter cart is moved in a generally perpendicular direction to the primary direction of transport with the third coupling rail slidingly disposed between the first and second coupling rails.

42. A mother/daughter cart arrangement, comprising:
a mother cart having a mother cart frame defining a primary transport direction and supported by wheels for transport above an underlying surface;
at least one daughter cart having a daughter cart frame supported by casters above the underlying surface;
a coupling system for joining at the least one daughter cart to the mother cart for conveying the at least one daughter cart along the primary transport direction; and
a locking apparatus for locking the coupling rails against further motion with respect to one another at a desired transport position of the daughter cart with respect to the mother cart;
wherein:
the coupling system including first and second coupling rails attached to one of the mother and daughter cart frames, and a third coupling rail attached to the other of the mother and daughter cart frames;
the first, second and third coupling rails extending in a parallel manner to one another in a direction generally perpendicular to the primary transport direction and parallel the underlying surface, when the coupling rails are operatively engaged for transporting the daughter cart with the mother cart;
the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails; and
the locking apparatus is remotely dis-engagable, to thereby release the third rail and allow the daughter cart to be moved out of engagement from the mother cart.

43. A mother/daughter cart arrangement, comprising:
a mother cart having a mother cart frame defining a primary transport direction and supported by wheels for transport above an underlying surface;
at least one daughter cart having a daughter cart frame supported by casters above the underlying surface; and a coupling system for joining at the least one daughter cart to the mother cart for conveying the at least one daughter cart along the primary transport direction;

wherein:

the coupling system including first and second coupling rails attached to one of the mother and daughter cart frames, and a third coupling rail attached to the other of the mother and daughter cart frames;

the first, second and third coupling rails extending in a parallel manner to one another in a direction generally perpendicular to the primary transport direction and parallel the underlying surface, when the coupling rails are operatively engaged for transporting the daughter cart with the mother cart;

the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails; and one or more of the coupling system rails are configured such that they form a common rail connection for coupling and conveying two or more daughter carts with the mother cart using the common rail connection of the coupling system.

44. A method for joining at least one daughter cart to a mother cart, wherein the mother cart has a mother cart frame defining a primary transport direction and supported by wheels for transport above an underlying surface, and the daughter cart has a daughter cart frame supported by casters above the underlying surface, and the method comprises joining the at least one daughter cart to the mother cart using a coupling system that includes:

first and second coupling rails attached to one of the mother and daughter cart frames, and a third coupling rail attached to the other of the mother and daughter cart frames;

the first, second and third coupling rails extending in a parallel manner to one another in a direction generally perpendicular to the primary transport direction and parallel the underlying surface, when the coupling rails are operatively engaged for transporting the daughter cart with the mother cart;

the first and second coupling rails forming a channel between the first and second coupling rails;

at least one of the mother and daughter carts frames are moveable in a direction generally perpendicular to the primary transport direction to slideably position the third coupling rail in the channel without either the wheels of the mother cart or the casters of the daughter cart passing through the channel; and the daughter cart is coupled to and moves with the mother cart as the mother cart is moved in the primary transport direction while the third coupling rail is positioned in the channel between the first and second coupling rails.

45. A method for joining at least one daughter cart to a mother cart, wherein the mother cart has a mother cart frame defining a primary transport direction and supported by wheels for transport above an underlying surface, and the daughter cart has a daughter cart frame supported by casters above the underlying surface, and the method comprises:

joining the at least one daughter cart to the mother cart using a coupling system that includes:

first and second coupling rails attached to one of the mother and daughter cart frames, and a third coupling rail attached to the other of the mother and daughter cart frames;

the first, second and third coupling rails extending in a parallel manner to one another in a direction generally perpendicular to the primary transport direction and parallel the underlying surface, when the coupling rails are operatively engaged for transporting the daughter cart with the mother cart; and the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails;

configuring one or more of the coupling system rails to form a common rail connection for coupling and conveying two or more daughter carts with the mother cart; and using the common rail connection of the coupling system.

46. The method of claim 44, further including locking the daughter cart into the coupling system.

47. A method for joining at least one daughter cart to a mother cart, wherein the mother cart has a mother cart frame defining a primary transport direction and supported by wheels for transport above an underlying surface, and the daughter cart has a daughter cart frame supported by casters above the underlying surface, and the method comprises:

joining the at least one daughter cart to the mother cart using a coupling system that includes:

first and second coupling rails attached to one of the mother and daughter cart frames, and a third coupling rail attached to the other of the mother and daughter cart frames;

the first, second and third coupling rails extending in a parallel manner to one another in a direction generally perpendicular to the primary transport direction and parallel the underlying surface, when the coupling rails are operatively engaged for transporting the daughter cart with the mother cart; and the first and second coupling rails forming a channel between the first and second coupling rails for sliding receipt therein of the third coupling rail, in such a manner that the daughter cart is coupled to and moves with the mother cart as the mother cart is moved in the primary transport direction while the third coupling rail is positioned in the channel between the first and second coupling rails;

wherein the daughter cart includes a lockable swiveling caster wheel that is selectively lockable to preclude swiveling motion of the caster wheel, and the method further includes automatically unlocking the caster wheel with the coupling system as the daughter cart engages the mother cart, to thereby allow swiveling motion of the swiveling caster wheel when the daughter cart is coupled to the mother cart, and automatically locking the swiveling caster wheel against pivoting motion, with the coupling system, as the daughter cart disengages from the mother cart.

* * * * *